United States Patent [19]

Bresson

[11] 4,172,061

[45] Oct. 23, 1979

[54] ASPHALTIC CONCRETE COMPOSITIONS COMPRISING HYDROGENATED DIENE/VINYL AROMATIC COPOLYMERS

[75] Inventor: Clarence R. Bresson, Bartlesville, Okla.

[73] Assignee: Phillips Petroleum Company, Bartlesville, Okla.

[21] Appl. No.: 838,340

[22] Filed: Sep. 30, 1977

[51] Int. Cl.² ............................................. C08L 91/00
[52] U.S. Cl. .................... 260/28.5 AS; 260/28.5 B; 260/42.43
[58] Field of Search ............... 260/28.5 AS, 28.5 B, 260/42.43

[56] References Cited

U.S. PATENT DOCUMENTS

| | | | |
|---|---|---|---|
| 3,763,074 | 10/1973 | Rostler | 260/29.7 GP |
| 3,778,397 | 12/1973 | Gannon et al. | 260/28.5 AS |
| 3,849,355 | 11/1974 | Yamaguchi et al. | 260/28.5 AS |
| 3,900,692 | 8/1975 | Rostler | 260/28.5 AS |
| 3,930,100 | 12/1975 | McDonald | 260/28.5 AS |

FOREIGN PATENT DOCUMENTS

| | | | |
|---|---|---|---|
| 740027 | 8/1966 | Canada | 260/28.5 AS |
| 1342635 | 1/1974 | United Kingdom . | |
| 1474618 | 5/1977 | United Kingdom . | |

*Primary Examiner*—Melvyn I. Marquis

[57] ABSTRACT

Improved asphalt-containing compositions having excellent flexural fatigue test characteristics are prepared by incorporating into the mix during its preparation at least one hydrogenated diene/vinyl aromatic copolymer.

17 Claims, 1 Drawing Figure

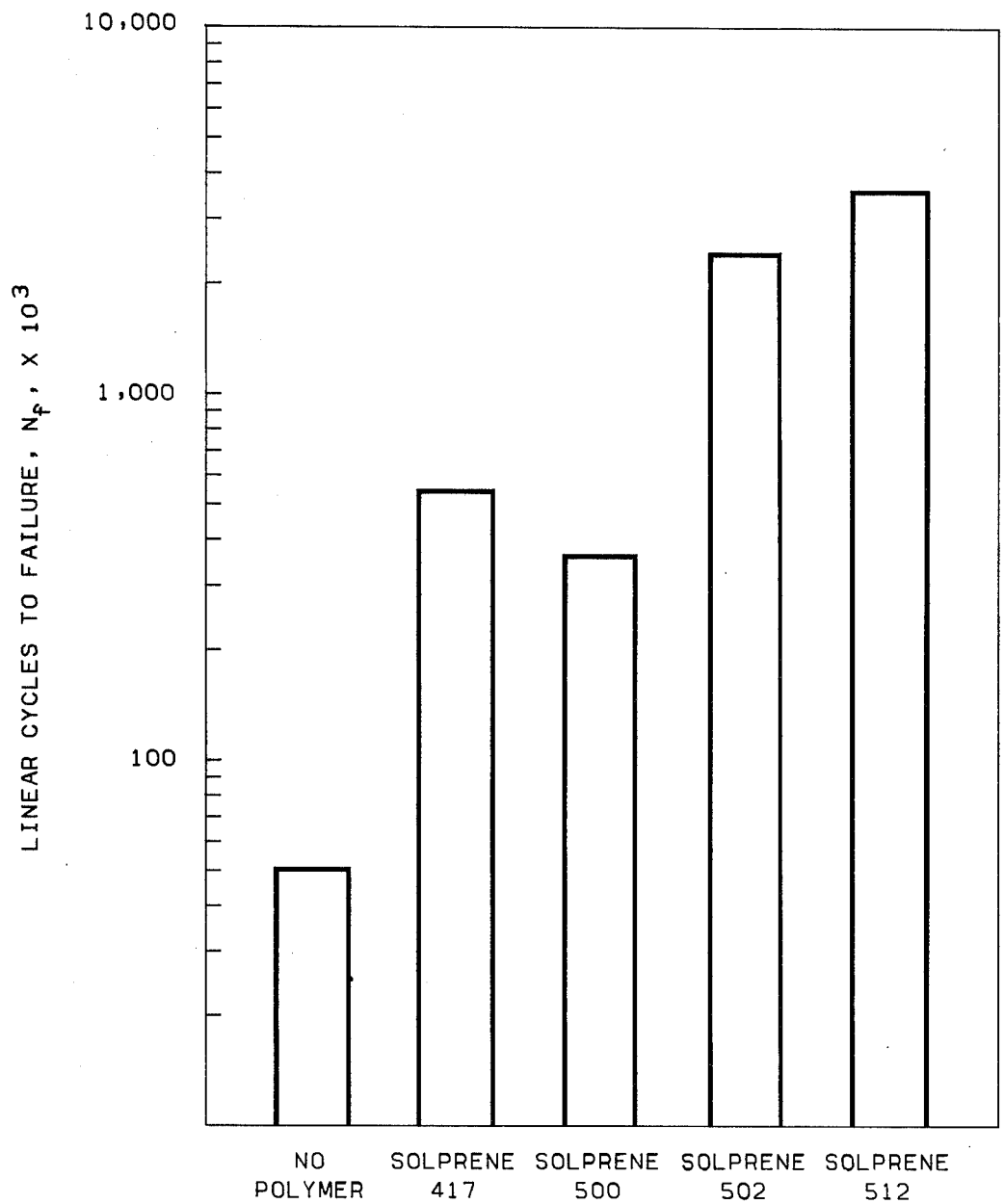

ASPHALTIC CONCRETE COMPOSITIONS COMPRISING HYDROGENATED DIENE/VINYL AROMATIC COPOLYMERS

This invention relates to improved asphaltic concrete compositions. More specifically, the invention relates to an asphalt-containing concrete composition exhibiting excellent flexural fatigue test characteristics or data. In one of its concepts, the present invention provides an asphaltic concrete composition exhibiting good flex life characteristics by incorporating into the composition as prepared a hydrogenated diene/vinyl aromatic copolymer. In another of its concepts, in a now preferred form, such a composition is prepared by premixing the hydrogenated copolymer and asphalt prior to admixing with the thus-obtained mixture the aggregate portion of the final composition. According to a further concept of the invention, the hydrogenated copolymer and asphalt are premixed at least until a homogeneous dispersion has been obtained. More specifically, a further concept of the invention involves admixing with an asphalt as described herein a hydrogenated copolymer prepared using a radial teleblock copolymer, prepared by using 1,3-butadiene or isoprene or mixtures thereof as conjugated diene and styrene as a monovinyl aromatic monomer. The copolymerization is completed with a coupling agent, e.g., a suitable polyepoxide. The copolymer obtained is then hydrogenated. The saturated (hydrogenated) copolymer will have a weight average molecular weight in the range of from about 75,000 to about 150,000, preferably from 75,000 to about 95,000.

For years, asphaltic concrete has been a major paving material for highways, streets, parking lots, and airport runways. Although not as durable as ordinary concrete, asphaltic concrete has enjoyed wide popularity because of its hard-like character, ease of application, and low cost. In spite of these advantages, asphaltic concrete has some disadvantages that have limited its wider usage such as: it softens in very hot weather, becomes brittle in cold weather, permits water to slowly penetrate, and it cracks when subjected to heavy traffic. Several attempts have been made to solve these problems, the most notable of which has been the addition of polymeric-type materials like conventional SBR, nitrile or butadiene-base polymers at the three to five weight percent level of polymer in asphalt; conventional asphaltic concrete typically contains five to seven percent asphalt. Even though these polymers solved or minimized some of the earlier problems, they themselves frequently contributed to additional problems such as: increased bulk viscosity making it more difficult to apply asphaltic concrete polymer compositions by conventional methods, gel formation, and incompatibility.

Not all of the above disadvantages have been solved, although many have been considerably reduced. Investigators have continually sought to develop asphaltic concrete compositions that have a longer service life, thereby reducing maintenance and installation costs. Many of these efforts have been directed toward improving the resistance to stress (fatigue) or cracking, a major performance property sought by most manufacturers and users of asphaltic concrete.

It has been found that the addition of the hydrogenated copolymer, as herein described, to an asphaltic concrete provides a final composition having excellent ability to withstand stress, as indicated by improvement in flexural fatigue characteristics. Such improvement is directed to extending the service life of an asphaltic concrete pavement or other similar type application, thus reducing maintenance costs.

Generally, a composition according to the invention will comprise a mineral aggregate, asphalt, and at least one hydrogenated copolymer as herein described. Such a composition can be applied in conventional manner as a hot mix.

It is an object of this invention to provide an asphaltic concrete composition. It is another object of this invention to provide an asphaltic concrete composition having improved service life. It is a still further object of this invention to provide an asphaltic composition exhibiting improved flexural fatigue test characteristics or properties.

Other aspects, concepts, objects, and the several advantages of this invention are apparent from a study of this disclosure and the appended claims.

According to the present invention, there is provided an improved asphaltic concrete composition comprising an asphalt, a mineral aggregate, and a hydrogenated diene/monovinyl aromatic copolymer.

Still according to the invention, there is provided a method for preparing an asphaltic concrete composition comprising at least an asphalt, a mineral aggregate, and a hydrogenated diene/monovinyl aromatic copolymer, the composition being prepared by first admixing to obtain a substantially homogeneous mix, the asphalt, and the said copolymer.

Asphalt

The asphalts which can be employed in this invention include conventional petroleum asphalts, natural asphalts, Gilsonite, air-blown asphalts, coal tar, and other such similar type materials. The asphalts can be characterized by having penetration grades of up to 300 as measured by ASTM Method D5. Currently preferred asphalts include air-blown asphalt of approximately 25–200 penetration grade and conventional petroleum asphalts of approximately 25 to 250 penetration grade.

Copolymers

Hydrogenated copolymers useful in the rubberized asphaltic concrete compositions of the invention include those based on about 40–85 parts conjugated diene/60–15 parts monovinyl aromatic which have been prepared as described in U.S. Pat. Nos. 3,281,383, Robert P. Zelinski and Henry L. Hsieh, issued Oct. 25, 1966, and 3,639,521, Henry L. Hsieh, issued Feb. 1, 1972, and then hydrogenated. The hydrogenation step can be conducted by any common method known to work with these type polymers such as nickel on kieselguhr, Raney nickel, palladium catalysts, etc. U.S. Pat. No. 3,554,911, Sidney Schiff, Marvin M. Johnson, and William L. Streets, issued Jan. 12, 1971, is cited as exemplary for the preparation of a hydrogenated butadiene/styrene (41/59) copolymer having about 20 percent block polystyrene by weight. The disclosures of these patents are incorporated herein by the reference to them.

The radial block polymer used in this invention can in a broad sense be depicted as an $(A-B)_xY$ type polymer or as $(A-B-A)_xY$ wherein A represents a non-elastomeric polymer block or segment and B represents an elastomeric polymer segment. Y is an atom or group of atoms derived from the polyfunctional treating agent used in the formation of the radial polymers and x represents the number of functional groups of said polyfunctional treating agent and is an integer of at least 3.

The radial block polymers are produced by incremental addition of monomers with the additional step of adding a polyfunctional treating agent to the polymerization mixture after the polymerization has been completed but prior to the inactivation of the polymerization initiator.

Thus a radial block polymer can be characterized as having at least three polymer branches with each branch of the radial block polymer comprising terminal non-elastomeric segments.

The branches of the radial block polymer contain a terminal non-elastomeric segment and at least a second elastomeric polymer segment joined thereto. The branches can also contain a third segment of non-elastomeric polymer.

The polymer branch lastly described would then be identical to the aforedescribed linear block polymers of this invention. Coupling the linear block polymer with the polyfunctional treating agent having at least three functional groups thus forms one type of radial polymer. The most common types, however, of radial block polymers prepared according to this invention contain only a terminal non-elastomeric segment and an elastomeric segment.

The non-elastomeric terminal segment of the radial block polymer comprise homopolymers made from monovinyl-substituted aromatic hydrocarbons containing from about 8 to 18 carbon atoms per molecule as well as copolymers including both random and block, comprising at least 70 percent by weight of one or more polymerized monovinyl-substituted aromatic hydrocarbon monomers and not more than 30 percent by weight of one or more of said conjugated diene monomers or polar monomers such as a-, or β-unsaturated nitriles and esters of acrylic and methacrylic acid.

The elastomeric segment of the radial polymer branch comprises polymers prepared from conjugated dienes containing from about 4 to 12 carbon atoms per molecule as well as copolymers including both random and block thereof, comprising at least 70 percent by weight of one or more polymerized conjugated diene monomers and not more than 30 percent by weight of one or more of said polymerized polar monomers or said monovinyl-substituted aromatic hydrocarbon monomers.

Radial teleblock copolymers useful in this invention are represented by the formula $$(AB)_xY \text{ or } (ABA)_xY$$

wherein A is a polyvinyl-substituted aromatic block segment containing 8 to 18 carbon atoms per molecule; B is a hydrogenated polyconjugated diene block segment containing 4 to 12 carbon atoms per molecule; x equals at least 3; and Y is as above defined.

Examples of vinyl-substituted aromatic compounds, conjugated dienes and coupling agents useful in the herein described invention are defined in U.S. Pat. No. 3,639,521. Only the polyepoxide coupling agents were used for the hydrogenated polymers.

The now preferred hydrogenated copolymers are prepared using radial teleblock copolymers, prepared by using 1,3-butadiene or isoprene or mixtures thereof, styrene as monovinyl aromatic monomer, and polyepoxides as coupling agents, and then followed by hydrogenating. The physical characteristics of hydrogenated copolymers used in this invention, including the nonhydrogenated controls, are shown as follows:

| Trade Name | Polymer Type | Diene[a]/ Styrene Ratio | Coupling Agent | Molecular Weight, Weight Average, $M_w$ |
|---|---|---|---|---|
| 1. Unsaturated | | | | |
| Solprene® 417 | Radial Teleblock | 80/20 | $SiCl_4$ | 190,000 |
| 2. Saturated (Hydrogenated) | | | | |
| Solprene® 500[b] | (Random/Block)[d] | 40/60 | None | 75,000 |
| Solprene® 502[c] | Radial Teleblock | 70/30 | Polyepoxide | 95,000 |
| Solprene® 512[b] | Radial Teleblock | 70/30 | Polyepoxide | 95,000 |

[a]Diene is 1,3-butadiene.
[b]Less than 30 percent vinyl before hydrogenation.
[c]Greater than 30 percent vinyl before hydrogenation.
[d]Having about 20 percent block polystyrene by weight.
Solprene is a trademark of the Phillips Petroleum Company.

Aggregate

Aggregate materials used in this invention include such as chat, sand, screened pebbles or rock, and the like. The particle size of this aggregate varies depending upon application. For paving applications which is the major area of interest of the present invention, individual states or localities have their own specifications which define the aggregate as a mixture of various particle size (sieve) materials combined such that the amount of void spaces vary from 3–25 percent. For most highway and street paving, a six percent void is generally considered normal. A typical distribution of aggregate size used in road surfacing is shown as follows:

| Aggregate Distribution[1] | | | |
|---|---|---|---|
| Mixture | Type A | Type B | Type C |
| Recommended Use | Base or Binder | Binder or Surface | Leveling or Surface |
| Sieve Size | Percent by Weight Passing | | |
| 3.81 cm (1½ inch) | 100 | | |
| 2.54 cm (1 inch) | 80–100 | | |
| 1.90 cm (¾ inch) | | 100 | |
| 1.27 cm (½ inch) | 60–80 | 80–100 | 100 |
| 0.95 cm (⅜ inch) | | 70–90 | 80–100 |
| No. 4 | 40–55 | 50–70 | 55–75 |
| No. 10 | 30–45 | 35–50 | 40–55 |
| No. 40 | 15–30 | 15–30 | 18–33 |
| No. 80 | 8–20 | 10–20 | 10–22 |
| No. 200 | 2–8 | 3–9 | 4–10 |

[1]Standard Specifications for Highway Construction, Edition of 1967, Oklahoma State Highway Commission.

Proportions of Components of Asphaltic Concrete Compositions

The components of asphaltic concrete compositions according to the invention generally will be employed in the amounts given in the following table:

| | Weight Percent | |
|---|---|---|
| Ingredient | Broad | Preferred |
| Mineral aggregate | 96.95–77.0 | 95.3–91.2 |
| Asphalt | 3.0–20.0 | 4.5–8.0 |
| Hydrogenated copolymer | (2–15 parts per hundred asphalt) 0.05–3.0 | (5–10 parts per hundred asphalt) 0.20–0.80 |

Preparation of Asphaltic Concrete Compositions

In the preparation of a composition of the invention, it is now generally desirable to premix the hydrogenated copolymer and asphalt prior to mixing with the aggregate. The premixing of the asphalt and copolymer can be accomplished using any desired procedure to produce a homogeneous dispersion. For the tests described below, the asphalt and copolymer were blended in a sigmoid blade type mixer such as a Day Mixer at about 204° C. (400° F.) for at least 2–4 hours or until the mixture is homogeneous as judged by visual examination.

The asphaltic concrete composition of this invention ordinarily is prepared by mixing the asphalt-hydrogenated copolymer premix and the aggregate in any manner which produces an asphaltic concrete composition having the desired properties. On a laboratory scale, it is preferred to preheat the asphalt-hydrogenated copolymer premix and aggregate to about 148°–163° C. (300°–325° F.) for about 18–24 hours for conditioning after which the components are weighed according to the desired amounts and mixed for two minutes in a preheated 135° C. (275° F.) pug mill mixer. The hot mix is transferred to an 18 inch circular mold and compacted for laboratory flexural fatigue testing. The amount of material charged depends on the thickness of the specimen desired and is shown as follows:

| Specimen | 5.08 cm | 4.06 cm | 3.56 cm | 3.18 cm |
|---|---|---|---|---|
| Thickness | (2.0 inch) | (1.6 inch) | (1.4 inch) | (1.25 inch) |
| Aggregate (<1.27 cm, ½ inch) | 13,765 g | 10,325 g | 9,035 g | 8,065 g |
| Sand | 4,590 g | 3,400 g | 3,010 g | 2,690 g |
| Asphalt-Hydrogenated Copolymer | 1,005 g | 755 g | 660 g | 590 g |

Asphaltic concrete compositions described herein can be applied as a hot mix for pavement and other similar hard-surfaced applications using conventional asphaltic concrete equipment. The method of application is similar to that used for asphaltic concrete containing no hydrogenated copolymer which is known to those skilled in the art.

EXAMPLE I

The asphaltic concrete compositions prepared in this and succeeding examples were prepared in accordance with the following recipe:

| Component | Parts by Weight |
|---|---|
| Aggregate (0.95 cm, ⅜ inch and less) | 71.11 |
| Sand | 23.69 |
| Asphalt | 4.94 |
| Copolymer | 0.26 |
| | 100.00 |

The aggregate and sand employed in the above recipe had a particle size distribution as follows:

| | Weight Percent Passing Through Sieve | | | | | |
|---|---|---|---|---|---|---|
| Sieve Size | 0.95 cm (⅜ inch) | No. 4 | No. 10 | No. 40 | No. 80 | No. 200 |
| Aggregate | 70.4 | 34.0 | 20.6 | 10.7 | 9.0 | 8.0 |
| Sand | 25.0 | 25.0 | 24.4 | 19.7 | 2.3 | 0 |
| Total | 95.4 | 59.0 | 45.0 | 30.4 | 11.3 | 8.0 |

The asphalt and copolymer was premixed in a sigmoid blade mixer such as a Day Mixer at 204° C. (400° F.) for at least about two to four hours. The aggregate and asphalt/copolymer were heated to 148.9° C.–162.8° C. (300°–325° F.) for about 18 hours, transferred to a preheated (135° C./275° F.) laboratory type pug mill and mixed for two minutes. The hot mix was transferred to an 18 inch circular mold and compacted for four minutes such that about 181.6 kg (400 lbs.) load was generated on the surface of the specimen. The specimen thickness was 4.06 cm (1.6 inch). After allowing the specimen to condition at ambient room temperature for five days, flexure fatigue testing was conducted in accordance with ASTM Special Publication STP 508 "Fatigue of Compacted Bituminous Aggregate Mixtures" by R. A. Jimenez, July, 1972. Flexure Fatigue testing is briefly described as the number of rapidly repeated stresses (cycles) conducted on an asphaltic concrete sample before significant cracks or failures are detected.

The following table and figure contain evaluation data obtained on asphaltic concrete compositions prepared according to this invention. The FIGURE shows some of the data, for comparison, obtained in flexure tests.

TABLE I

Flexural Fatigue Test Data[a] on Polymer Additives in 85-100 Pen Asphalt

| No. | Additive[b] | Thickness cm. | Thickness inches | Radial Stress[c] MPa | Radial Stress[c] psi | Linear Failure, $N_f$[d] Cycles × $10^3$ | Improvement Factor[e] |
|---|---|---|---|---|---|---|---|
| 1. | None (Control) | 4.06 | 1.60 | 0.855 | 124 | 51.5 | 1.0 |
| 2. | Solprene® 417 | 4.09 | 1.61 | 0.848 | 123 | 557.5 | 10.8 |
| 3. | Solprene® 500 | 4.09 | 1.61 | 0.848 | 123 | 370.0 | 7.2 |
| 4. | Solprene® 502 | 4.04 | 1.59 | 0.862 | 125 | 2,462.0[f] | 54[f] |
| 5. | Solprene® 512 | 4.04 | 1.59 | 0.862 | 125 | 3,600.0 | 69.9 |

[a]Data based on the average of two tests.
[b]5 Weight percent Solprene (a registered trademark of Phillips Petroleum Company) in asphalt.
[c]Radial Stress, $S_r$, is defined as the stress between a point within the specimen and the outer circumference and is calculated according to the eqation $S_r = 1/t^2 (309.21 + 1.3344d)$ where t = specimen thickness in inches and d = repeated deflection at the center of specimen in thousandths of inches.
[d]Linear Failure, $N_f$, is defined as the number of cycles required before failure occurs.
[e]Improvement Factor, defined as $N_f$ of polymer additive containing asphalt concrete specimen ÷ $N_f$ of asphalt concrete specimen containing no polymer additive.
[f]Data obtained with different batch of the same type 85-100 Pen asphalt. This batch had an $N_f$ of 45.5 × $10^3$ cycles from which the Improvement Factor was calculated.

The data in Table I illustrate that when diene-styrene copolymers such as Solprene 417 (80 parts by weight butadiene/20 parts by weight styrene-unsaturated radial teleblock copolymer) or Solprene 500 (41 parts by weight butadiene/59 parts by weight styrene-saturated random block copolymer) was added to asphaltic concrete the resistance to fail or crack after repeated stress was enhanced (refer to Nos. 2 and 3) beyond that of the control (Specimen 1) where no polymer additive was present. However, the surprising feature was that when a hydrogenated radial teleblock copolymer having a diene/styrene weight ratio of about 70/30 was employed, such as Solprene 502 and Solprene 512 (Nos. 4 and 5), the improvement was almost five to ten times that where other diene/styrene copolymers were used (Nos. 2 and 3) at the same level in asphaltic concrete. Compared to the control (No. 1) where no copolymer was present, the improvement was 50-60 times as great. This vast improvement using the hydrogenated radial teleblock copolymers is interpreted as extending the service life of the asphaltic concrete thus reducing maintenance costs. It is also interpreted as an indication that a less thick asphaltic concrete composition is necessary, which would have the effect of reducing installation costs. The data are again better visualized graphically in the FIGURE.

The weight average molecular weight of the hydrogenated polymer will usually be in the approximate range of from about 50,000 to about 500,000; it, of course, being understood that the polymer selected will be blendable with the asphalt and it is now preferred to be reasonably solid as distinguished from a liquid.

Reasonable variation and modification are possible within the scope of the foregoing disclosure, the drawing, and the appended claims to the invention the essence of which is that a hydrogenated diene/vinyl copolymer, as described, has been incorporated into an asphalt concrete composition and has been found to give excellent flex life improvement; particularly, it has been found that the hydrogenated copolymers in which the diene/styrene weight ratio is at least about 40/60 will give considerable improvement; more particularly, that at a weight ratio of diene/styrene of about 70/30 and a weight average molecular weight range of about 70,000 to 150,000 even more surprisingly gives an even more considerable improvement.

I claim:

1. An asphaltic concrete composition comprising an asphalt, a mineral aggregate, and a hydrogenated radial teleblock diene/mono vinyl aromatic copolymer wherein the weight ratio of the diene to the monovinyl monomer is about 70/30 and the weight average molecular weight range is from about 70,000 to about 150,000.

2. A composition according to claim 1 wherein the diene is selected from butadiene and isoprene and the vinyl compound is styrene.

3. A composition according to claim 1 wherein the asphalt and the hydrogenated copolymer are blended to produce a homogeneous dispersion before the aggregate is then admixed therewith.

4. A composition according to claim 1 wherein the ingredients of the composition are as follows:

| Ingredient | Weight Percent |
|---|---|
| Mineral aggregate | 96.95-77.0 |
| Asphalt | 3.0-20.0 |
| Copolymer | (2-15 parts per hundred asphalt) 0.06-3.0 |

5. A composition according to claim 2 wherein the ingredients of the composition are as follows:

| Ingredient | Weight Percent |
|---|---|
| Mineral aggregate | 96.95-77.0 |
| Asphalt | 3.0-20.0 |
| Copolymer | (2-15 parts per hundred asphalt) 0.06-3.0 |

6. A composition according to claim 3 wherein the ingredients of the composition are as follows:

| Ingredient | Weight Percent |
|---|---|
| Mineral aggregate | 96.95-77.0 |
| Asphalt | 3.0-20.0 |
| Copolymer | (2-15 parts per hundred asphalt) 0.06-3.0 |

7. A composition according to claim 1 wherein the ingredients of the composition are as follows:

| Ingredient | Weight Percent |
|---|---|
| Mineral aggregate | 95.3-91.2 |

-continued

| Ingredient | Weight Percent |
| --- | --- |
| Asphalt | 4.5–8.0 |
| Copolymer | (5–10 parts per hundred asphatl) 0.20–0.80 |

8. A composition according to claim 2 wherein the ingredients of the composition are as follows:

| Ingredient | Weight Percent |
| --- | --- |
| Mineral aggregate | 95.3–91.2 |
| Asphalt | 4.5–8.0 |
| Copolymer | (5–10 parts per hundred asphatl) 0.20–0.80 |

9. A composition according to claim 3 wherein the ingredients of the composition are as follows:

| Ingredient | Weight Percent |
| --- | --- |
| Mineral aggregate | 95.3–91.2 |
| Asphalt | 4.5–8.0 |
| Copolymer | (5–10 parts per hundred asphatl) 0.20–0.80 |

10. An asphalt concrete composition comprising an asphalt, a mineral aggregate, and a hydrogenated diene/vinyl aromatic radial teleblock copolymer having the general formula $$(AB)_xY \text{ or } (ABA)_xY$$

wherein A is a vinyl-substituted aromatic block polymer, B is a hydrogenated conjugated diene block polymer, Y is a polyfunctional coupling agent, x is at least $=3$, and wherein the weight ratio of the diene to the vinyl aromatic monomer is approximately 70/30.

11. An asphalt concrete composition comprising an asphalt, a mineral aggregate, selected from the following: chat, sand, pebbles and rock, and a hydrogenated radial teleblock copolymer of a diene, selected from butadiene and isoprene, and styrene, having a weight average molecular weight in the range of from about 70,000 to about 150,000 and having been produced with a polyepoxide coupling agent, and wherein the weight ratio of the diene to styrene is approximately 70/30.

12. A composition according to claim 11 wherein the diene is butadiene.

13. A composition according to claim 11 wherein the weight average molecular weight is about 95,000.

14. A composition according to claim 10 wherein the weight average molecular weight is in the approximate range of 70,000–150,000.

15. A composition according to claim 10 wherein the parts by weight per hundred parts by weight of the composition are: asphalt, 3 to 20, copolymer 0.05–3.

16. A composition according to claim 1 wherein the parts by weight per hundred parts by weight of the composition are: asphalt, 3 to 20, copolymer 0.05–3.

17. A composition according to claim 11 wherein the amount of void spaces in the aggregate is in the range 3–25%.

* * * * *